United States Patent
Raad et al.

(10) Patent No.: US 6,455,975 B1
(45) Date of Patent: Sep. 24, 2002

(54) REGULATED PERMANENT MAGNET GENERATOR

(75) Inventors: Bernard Raad, Oxnard; Leon Kasdan, Carpenteria, both of CA (US)

(73) Assignee: Pacific Scientific Electro Kinetics Division, Carpinteria, CA (US)

( * ) Notice: Subject to any disclaimer, the term of this patent is extended or adjusted under 35 U.S.C. 154(b) by 0 days.

(21) Appl. No.: 09/614,447

(22) Filed: Jul. 12, 2000

Related U.S. Application Data

(60) Provisional application No. 60/169,004, filed on Dec. 3, 1999.

(51) Int. Cl.[7] .............................. H02K 1/06; H02K 7/12; H02K 21/12
(52) U.S. Cl. ........................... 310/209; 310/51; 310/66; 310/77; 310/152; 310/254; 310/261
(58) Field of Search ................................ 310/261, 152, 310/156, 209, 112, 77, 51, 66, 254

(56) References Cited

U.S. PATENT DOCUMENTS

| | | | | |
|---|---|---|---|---|
| 414,659 A | * | 11/1889 | Seafert ........................ | 310/261 |
| 422,862 A | * | 3/1890 | Washburn .................... | 310/261 |
| 3,822,768 A | * | 7/1974 | Sebulke ..................... | 188/70 R |
| 4,328,411 A | * | 5/1982 | Haller et al. ................. | 29/596 |
| 4,395,815 A | * | 8/1983 | Stanley et al. ............... | 210/216 |
| 4,628,220 A | * | 12/1986 | Flogvall ...................... | 310/112 |
| 4,658,228 A | | 4/1987 | Leupold ...................... | 335/211 |
| 4,663,581 A | | 5/1987 | Glennon ...................... | 322/52 |
| 4,759,186 A | | 7/1988 | Sugden ........................ | 60/473 |
| 4,777,397 A | | 10/1988 | Parshal ........................ | 310/156 |
| 4,879,484 A | | 11/1989 | Huss .......................... | 310/114 |
| 5,033,265 A | | 7/1991 | Sugden ........................ | 60/444 |
| 5,130,592 A | * | 7/1992 | Bitsch et al. ................ | 310/209 |
| 5,300,848 A | | 4/1994 | Hess et al. ................... | 310/83 |
| 6,025,769 A | | 2/2000 | Chu et al. .................... | 335/216 |
| 6,236,124 B1 | * | 5/2001 | Sekiyama et al. ............ | 310/12 |

FOREIGN PATENT DOCUMENTS

| | | | | |
|---|---|---|---|---|
| BE | 500587 | * | 1/1951 | |
| DE | 1088600 | * | 9/1960 | |
| DE | 3940487 | * | 6/1991 | ............ H02K/7/12 |
| EP | 304974 | * | 1/1989 | ............ H02P/9/40 |
| JP | 52-150509 | * | 12/1977 | .......... H02K/24/56 |
| JP | 8-80019 | * | 3/1996 | .......... H02K/21/14 |
| SU | 694953 | * | 10/1979 | |

* cited by examiner

Primary Examiner—Burton S. Mullins
(74) Attorney, Agent, or Firm—Ralph D. Chabot

(57) ABSTRACT

A regulated permanent magnet generator incorporating a "tapered" or conical design for improved voltage regulation. The tapered faces of the rotor and stator are axially displaced from one another as the demand for voltage changes. In addition, this design allows for the stator and rotor to be used as a braking mechanism when placed into frictional contact with one another such as to prevent windmilling. This design offers better space efficiency when used with certain engine applications.

9 Claims, 5 Drawing Sheets

REGULATED PERMANENT MAGNET GENERATOR

This application claims priority under 35 U.S.C. Section 119(e) to a provisional application filed Dec. 3, 1999 bearing Ser. No. 60/169,004.

TECHNICAL FIELD

This invention relates to a permanent magnet generator (PMG) through which: 1) the physical airgap between the stator and rotor can be varied to obtain a desired voltage; and 2) the shaft/hub can be used as a braking mechanism.

BACKGROUND OF THE INVENTION

A permanent magnet generator (PMG) features a constant magnetic field. Consequently, its voltage output is dependent upon two factors:

(a) Its rotational speed, according to the formula:

$$e = N d\phi/dt$$

where:
e=generated voltage
N=number of turns
$d\phi/dt$=change in flux with respect to time
$d\phi/dt$=speed (DC field)

Therefore, with every other parameter held constant, speed is the only factor that affects voltage output (at no load), because it serves to vary $d\phi/dt$; and, (b) the load it is powering, according to the phasor diagrams:

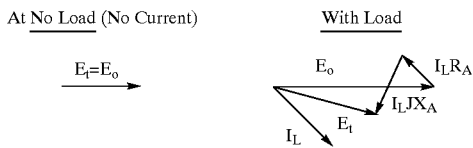

At No Load (No Current)    With Load $E_t = E_o$

The above diagrams show that, when the internal resistance ($R_A$) and reactance ($X_A$) of the machine are factored with the load current ($I_L$), the terminal voltage ($E_T$) is equal to the vectorial sum of generated voltage ($E_C$) and the machine internal voltage drops. Thus, the output voltage of a simple PMG can be stabilized by stabilizing speed and loading. However, most real-world applications, such as, for example, a turbine engine that is also used for propulsion, require that regulated power be delivered by a generating system which can operate over a wide range of speeds and loads.

Therefore, generator designers have long been challenged by the problem of regulating the output of a PMG, and have formulated various designs over the years. These designs, or methods to regulate a PMG, are well known in the prior art, but each suffers from some disadvantage. The following describes prior art attempts to regulate PMG output.

A. Power Converters

The prior art includes devices such as power conversion units and power conditioning units that utilize electronic components to regulate the output of a PMG whose load and speed vary. However, the complexity of such devices increases dramatically if they are required to operate over wider ranges of voltage. For example, a power converter that operates over a 3:1 voltage range is several times more complex than one that handles a 2:1 voltage range. In addition, although power converters may be employed successfully for low power ratings (up to 2,000 Watts), power converters are rarely suitable for higher power requirements because they are more complex, costly to produce, and cause installation problems due to their relatively large size.

B. Load Regulation

Other prior art methods have attempted to regulate PMG output by imposing on it a parasitic or artificial load. The magnitude of this load is adjusted to maintain a constant terminal voltage, and counteract voltage fluctuations caused by changes in speed and load. This method does indeed regulate PMG output, although the applied parasitic load is detrimental to efficiency and wastes energy in the form of heat.

C. Rotor Displacement

Yet another prior art method has addressed regulation of PMG output by a method commonly known as "rotor displacement". As its name implies, this scheme involves displacing the rotor and stator magnetic centerlines from each other, thereby altering the effective air gap of the alternator. Stated differently, since the stator and rotor are cylindrical in shape, there is an annular air gap there between. Axial displacement of the rotor results in a change to the magnetic flux transferred from the rotor to the stator. This change in the magnetic flux is noticeable, but only after an appreciable displacement of the rotor has occurred.

This method works to some extent, but it suffers from at least two significant drawbacks. First, substantial relative movement must occur before any perceptible effect is detected in the output voltage. Longer rotors require more displacement than shorter-length rotors. The second drawback is that because the change in output voltage does not instantaneously change with rotor displacement, the regulation response time is inadequate for most applications.

SUMMARY OF THE INVENTION our concept is an improvement over the prior art "rotor displacement" PMG. Our invention departs from the conventionally cylindrical rotor and stator design, in favor of a "tapered" or conical design. AS fully described herein, our design results in more efficient and effective voltage regulation, and also in better space efficiency when dealing with certain applications.

DESCRIPTION OF THE INVENTION

Our invention is primarily a tapered stator surface that faces a tapered rotor surface. The terms taper and conical can be used interchangeably and have the same meaning.

The PMG according to our invention can be in either one of two embodiments; each embodiment also capable of multiple variations as will be discussed.

The first embodiment is a stator having a tapered inner diameter and a rotor having a tapered outer diameter. The second embodiment is a rotor having a tapered inner diameter and a stator having a tapered outer diameter.

Our invention comprises a magnet assembly or magnetic field, which interacts with an armature through relative angular motion. The magnet assembly, i.e. rotor, may be located within the armature assembly, i.e. stator, (first embodiment), or the armature may be located within the magnetic field, for an equal electromagnetic effect (second embodiment). Our design can comprise a magnetic field located within an armature assembly, or an armature assembly located within a magnetic field.

The rotor and shaft are supported by bearings, arranged in such a manner as to provide rigid radial support, but allow unimpeded axial movement within a desired range. This effect may be achieved by a variety of means, such as utilizing bearings which can "slide" within their journals or bearing support; or use roller bearings with extra long races to permit the rotor to travel axially, or a combination thereof.

Another means for permitting rotor axial movement while maintaining rigid radial support is by the use of a "flexing bearing support". As its name implies, the flexing bearing support is a device that is employed to keep the bearing centered on the axis of rotation, while allowing it to be moved axially. It consists of a hub, a plurality of tangential spokes, a mechanism to adjust the length of each spoke, and a outer web that anchors the spokes and refers them to the stator. The hub contains the bearing. Because the spokes are arranged tangentially, they permit two degrees of freedom. The first degree of freedom is circumferential, but against the direction of rotation. Thus, when the hub is angled back, the spokes become too long and the hub must be displaced axially to compensate for the added radial length. The opposite is also true. If the hub is displaced axially, it must also turn against the direction of rotation to allow the span length of the spokes to increase. Thus, is established the second degree of freedom, which is axial. Axial displacement causes the physical airgap to change, thereby regulating the voltage output of the generator.

Our design permits shaft movement in an axial direction. A slight displacement of the shaft in our PMG design is sufficient to significantly alter the physical airgap, or distance between the tapered surfaces of the rotor and stator. The physical airgap affects flux leakage between poles.

Like its cylindrical counterpart, a tapered PMG comprises a magnet assembly or field, and an armature where the usable power is produced. Because the armature must be connected to the load, the armature is usually the stator, while the magnetic field assembly is the rotor. It is to be understood that the rotor may be located either within the stator, or around it, with equal effectiveness, depending on the particular application.

The following description describes the first embodiment mentioned at the beginning of this section where the outer surface of the rotor is facing the inner surface of the stator; i.e. with the magnetic field inside the armature.

The armature (stator) of the first embodiment comprises a core, or a stack of laminations that features a plurality of apertures or slots arranged in a circular pattern between the inner diameter (ID) and outer diameter (OD) of each lamination. In order to produce a "tapered lamination stack", computer-controlled lamination cutting technology is used, such as laser or wire electron discharge machining (EDM). The slots are preferably maintained at a constant size although circumferential spacing between each slot on a lamination is changed and is relative to the distance between each layer's OD and ID. The slots on each lamination have a common axis of symmetry with respective slots on the other laminations and form respective slot profiles. It should be understood that the size of each slot does not have to vary with each layer. All that is necessary is that the slots be of sufficient size to receive the wiring necessary to form an armature and have a common axis of symmetry with respective slots on other layers. The laminations are then assembled to form a stack and held together by bonding or other means which are well known in the art.

While the preferred method of achieving a tapered construction is with computer-controlled lamination cutting, it is also possible to achieve a similar taper through conventional stamping and machining. Thus, it may be more cost effective, when dealing with large production quantities, to design a series of stamping tools which would each produce portions of a cone so that when assembled, it would resemble a "staircased" conical stack. Critical tolerances could be obtained in a final machining step.

It is to be understood that the laminated stack described above is the stator since this assembly requires the proper slot alignment for the armature. The rotor is not required to be manufactured by this technique.

Several advantages are offered by our tapered configuration.

1. Alteration of Physical Air Gap

The prior art consists essentially of a cylindrical rotor spinning within a cylindrical stator, where some output regulation is achieved by displacing one from the other axially, to change the effective air gap. The physical airgap between rotor and stator remains basically unchanged, and that is why regulation by this method is somewhat ineffective.

Using embodiment 1 as an example, the conical rotor spins facing a stator having a conical ID. Therefore, any axial displacement of the rotor results in a change in the actual or physical air gap. This enables effective voltage regulation. In fact, voltage regulation sensitivity is directly proportional to the degree of taper, with the two extremes represented by a cylindrical PMG (least sensitive), and an axial air gap (most sensitive).

Another way to view the invention is that the physical air gap between rotor and stator uniformly changes as the rotor is displaced away from the stator. In the prior art having a cylindrical stator/rotor configuration, axial displacement of the rotor does not change the physical air gap between rotor and stator; it only changes the length of rotor facing the stator inner surface. The length of rotor facing the stator measures the effective air gap although the physical air gap between stator and rotor remains the same.

With regard to the "staircase" taper mentioned earlier, even though stamping and machining may not produce a smooth, evenly tapered surface, the substantially tapered surface of the stator would nevertheless still permit voltage output regulation because the physical air gap between rotor and stator can be changed by axial rotor displacement.

2. Friction Brake

Another advantage of our invention is that the design may be used as a friction brake, simply by moving the rotor axially to eliminate the physical air gap between stator and rotor. In a generating environment, the PMG may be used as a brake to stop an engine from "windmilling", or other unwanted angular motion.

Our design has military application; particularly for missiles and drones. Typically, these are carried by aircraft to a particular aerial launching point and then released. While attached to the aircraft and during flight, the drone or missile rotor will "windmill" as a result of the air velocity. Windmilling results in unnecessary loss of bearing life. Our invention would eliminate windmilling and prolong bearing life by axially moving the rotor into frictional contact with the stator. Once at the launch point, the aircraft releases the missile and the rotor would axially displace away from contact with the stator and to a desired pre-determined physical air gap.

3. Efficient Design for Space Utilization

A regulated PMG is constructed utilizing a tapered configuration for both the stator and rotor assemblies. In the preferred embodiment, a shaft or hub is supported for rotation and axial displacement. The shaft itself can have an exterior taper or alternatively, a tapered hub can be mounted upon a standard non-tapered shaft. The tapered exterior surface can be typically machined. Attached to the tapered exterior surface are a plurality of magnets and the shaft/magnet configuration forms the rotor assembly.

The stator has a tapered ID configuration but, in a preferred embodiment, can also have a tapered OD. The tapered design can be made by either machining or assembling a series of laminated sections utilizing computer control and laser or chemical etching technology. A tapered core stack can be formed having a plurality of slots in each lamination with each slot have a common axis of symmetry with other corresponding slots on other laminations. As an example, sections can be made in thicknesses of 0.014 inch and then laminated together to form a tapered stator or core stack.

In order to obtain optimum sensitivity and predictable control for regulating the voltage generated, it is desired to have the identical taper angle for the stator and rotor/hub, thus always resulting in an air gap with parallel sides.

The stator, while requiring a tapered inner surface, can also be made having a tapered outer surface. An example of such use is in missile and drone applications. The generator is commonly mounted within the engine's stationary nose cone, and driven by a shaft coupled directly to the high speed turbine. A cylindrical alternator has traditionally been used, with the nose cone being suitably lengthened. However, the increased length of the nose cone can detrimentally affect the aerodynamics of the missile or drone, increasing fuel consumption, which in turn limits the maximum range. Our invention, having a conical configuration, has the added advantage of naturally fitting within the tapered layout of a nose cone, minimizing the need for nose cone length enhancements.

Our invention envisions commercial applicability in situations where variably adjusting the voltage of a PMG or use of the shaft/hub as a braking mechanism, or both would be desired.

PMG Movement Mechanism

As shown in the voltage vector diagrams at the beginning of this disclosure, a PMG always produces an internal voltage that is proportional to speed. However, this internal or generated voltage is reduced vectorially by the drop associated with the load factored by the internal generator impedance. Therefore, in order to compensate for these internal drops, and maintain a constant output or terminal voltage Et, the airgap is varied. This is accomplished in our PMG by rotor displacement. About one end of the shaft is a mechanical spring means, which can impart a directional force upon the shaft when it is either in compression or tension. This spring means can be a single spring, multiple springs in series, or two springs in concentric relation to one another. Preferably, a stack of Belleville washers are utilized. The shaft actually extends through the spring and is coupled to the engine's spline drive. About the other end of the shaft is a solenoid coil. The surface area of the shaft never contacts the mechanical spring or the solenoid coil.

In the preferred embodiment, the mechanical spring means exerts no directional force and this corresponds to a specific position or air gap, which can be the optimum air gap for generating a voltage. With a decrease in load, or an increase in speed, or combination of both, as less voltage is required to maintain a constant Et, direct current is passed through the solenoid coil, which increases the magnetic flux and causes the tapered rotor to displace further away from the tapered stator, and compress the mechanical spring. This increases the physical air gap between stator and rotor. Leakage results, and less flux is transferred to the armature along with a corresponding reduction in generated voltage.

When more generated voltage is required to maintain a constant Et, the amount of current applied to the coiled solenoid is reduced and the compressed mechanical spring displaces the rotor into closer contact with the stator.

Thus, passive regulation may be achieved with the coil connected across the PMG's rectified output.

Alternative Embodiments

1. The same type of variable displacement between stator and rotor can also be achieved by inverting the configuration and immobilizing the shaft, which now locates the stator, while allowing the magnets to rotate about the non-rotating armature. The solenoid coil and mechanical spring means would function as described earlier, but in this configuration, would axially displace the stator.

2. The shaft portion, whether the shaft is used as a rotor or stator, can be displaced and used as a brake to prevent windmilling or other unwanted motion. There are two configurations that can be utilized.

First, if no amperage is applied to the solenoid coil, the shaft is in its brake position with the mechanical spring exerting sufficient force to frictionally engage the tapered rotor against the tapered stator. Therefore, in order to provide any air gap between stator and rotor, amperage must be constantly applied to the solenoid coil in an amount to counteract the force applied by the mechanical spring, and that of magnetic attraction.

In the second configuration, if no amperage is applied to the solenoid coil, the mechanical spring means has no load and positions the rotor relative to the stator to obtain the optimum air gap for generating a maximum voltage. When braking is desired, the flow of direct current is reversed through the solenoid coil, causing the shaft to displace away from the mechanical spring means so that the rotor and stator frictionally engage. Termination of the reverse current would cause the mechanical spring means, now in tension, to displace the shaft back into position where the optimum air gap is located.

If the rotating shaft is not reasonably concentric, then it may be possible to produce undesired excessive heat on that portion of the shaft within the solenoid coil. To avoid this type of situation, thrust bearings may be required so that the portion of the shaft within the solenoid coil does not rotate; yet can be used to displace the rotating portion of the shaft so that the distance between rotor and stator can still be varied.

In order for the shaft to be displaceable in an axial direction, a shaft support means is incorporated into the design. Examples of suitable shaft support means include a pair of flexing bearing assemblies, or bearing assemblies arranged so that the outer race is allowed to slide within its support or sliding roller elements whereby the cylindrical roller element is allowed to slide within its race. Shaft support is necessary to minimize eccentricity of the shaft within the solenoid coil and the mechanical spring.

DESCRIPTION OF THE DRAWINGS

FIG 1 is a longitudinal cross section illustrating the rotor and stator having an airgap between.

DETAILED DESCRIPTION OF THE PREFERRED EMBODIMENT

Figure 3:
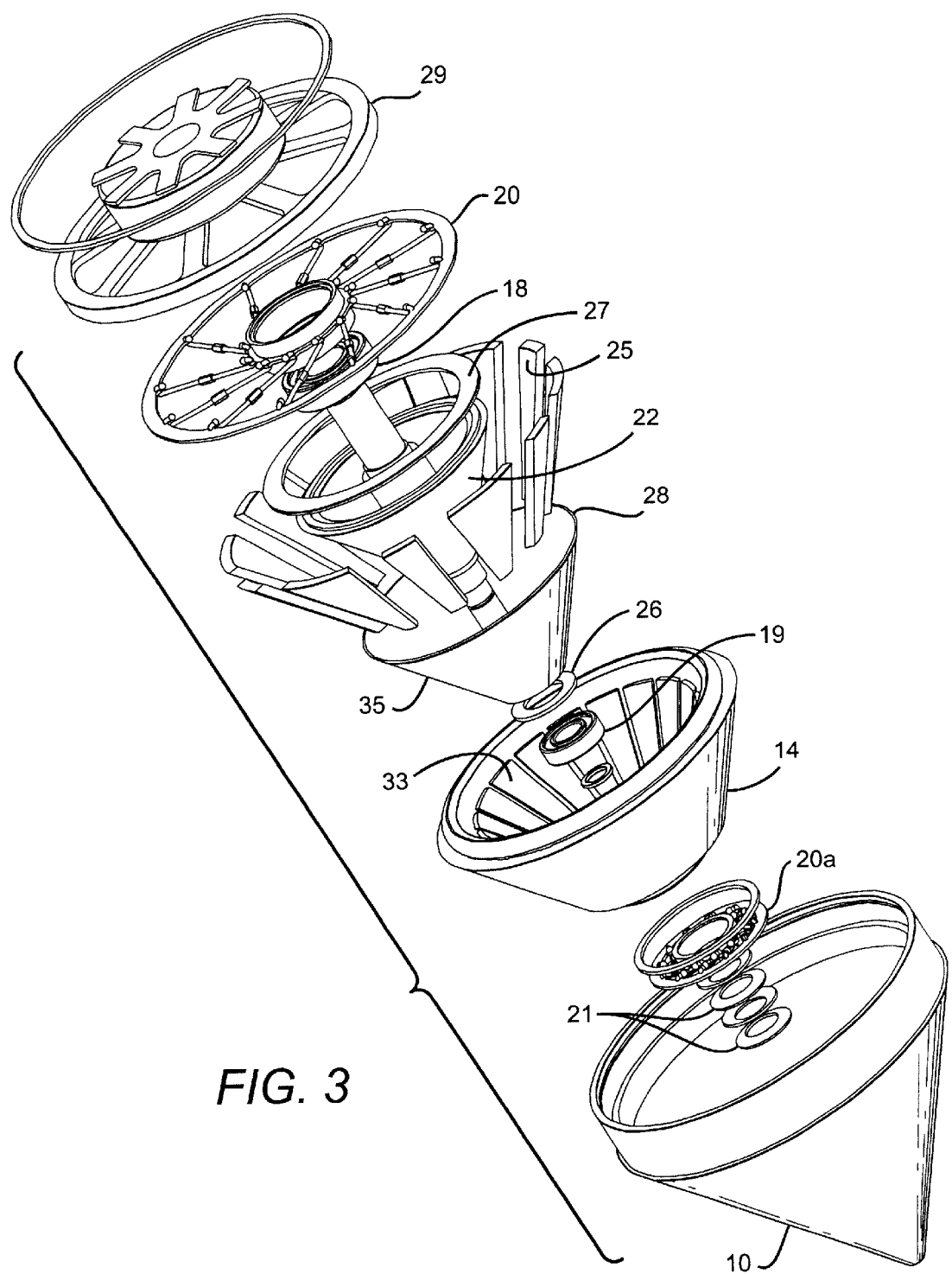
FIG. 3 is an exploded isometric view.
Figure 4:
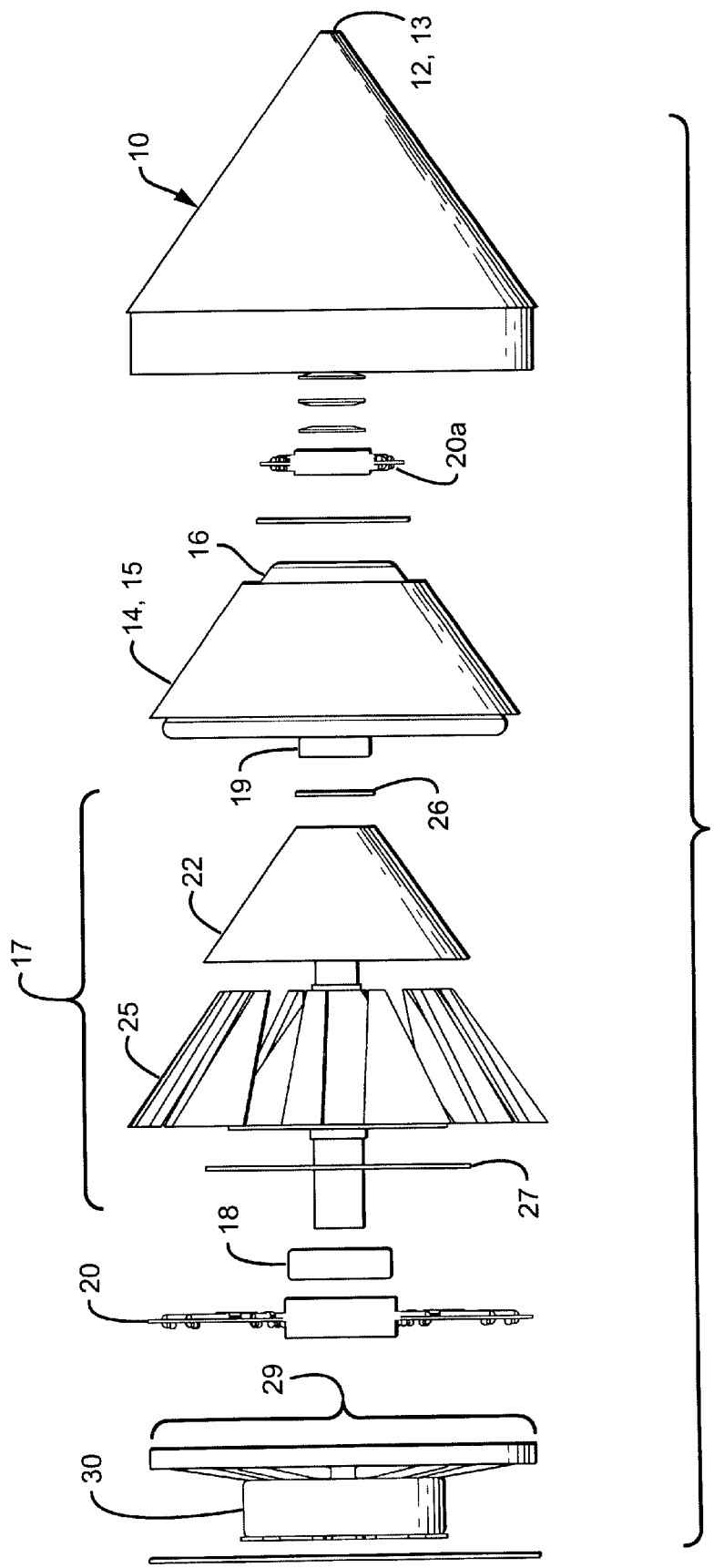
FIG. 4 is an exploded side view.
Figure 5:
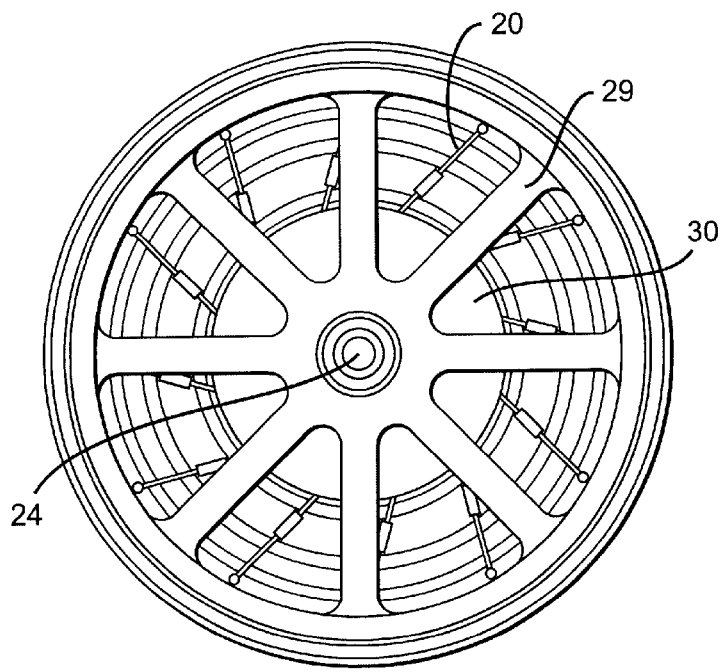
FIG. 5 is a rear view.
Figure 6:
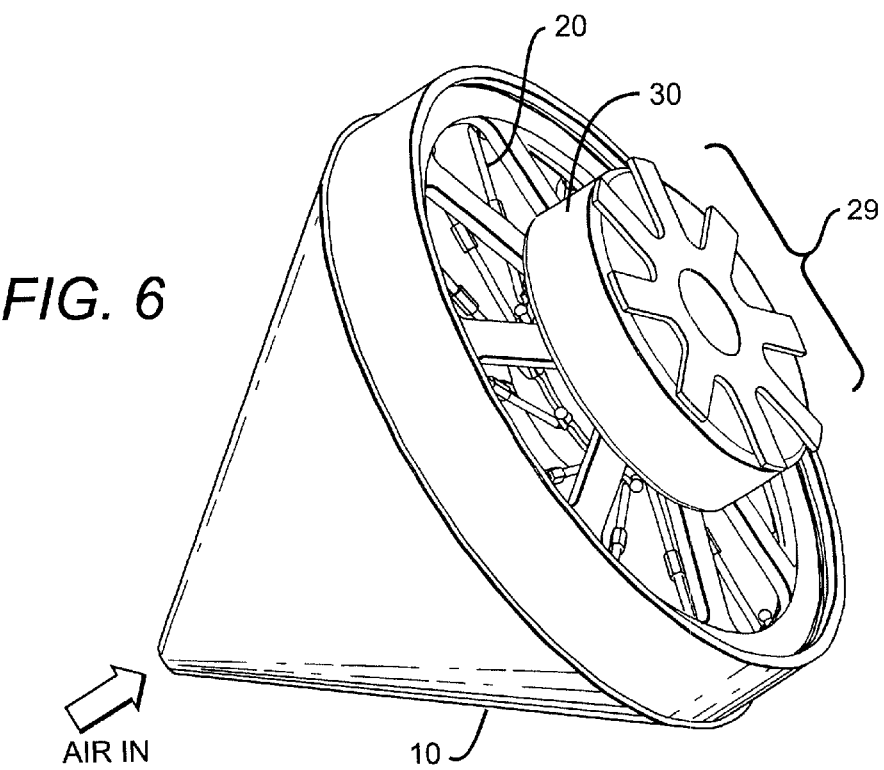
FIG. 6 is a perspective view.

In FIGS. 3, 4, and 6, the generator housing 10 takes the shape of the nose cone, where vents 12 and 13 are situated to admit air for cooling purposes. Housing 10 encloses a conical stator 14 that comprises a laminated core 15 and coil winding 16. Conical stator 14 having stator inner surface 33 surrounds a conical rotor 17 having a rotor outer surface 35. The rotor 17 is supported by drive end (DE) bearings 18 and anti-drive end (ADE) bearings 19. Holding the rotor assembly in position within the conical stator 14 are flexing bearing supports 20 and 20a.

As explained above, the flexing bearing supports provide very stiff radial support, while allowing axial movement within the confines of housing 10.

Figure 1:
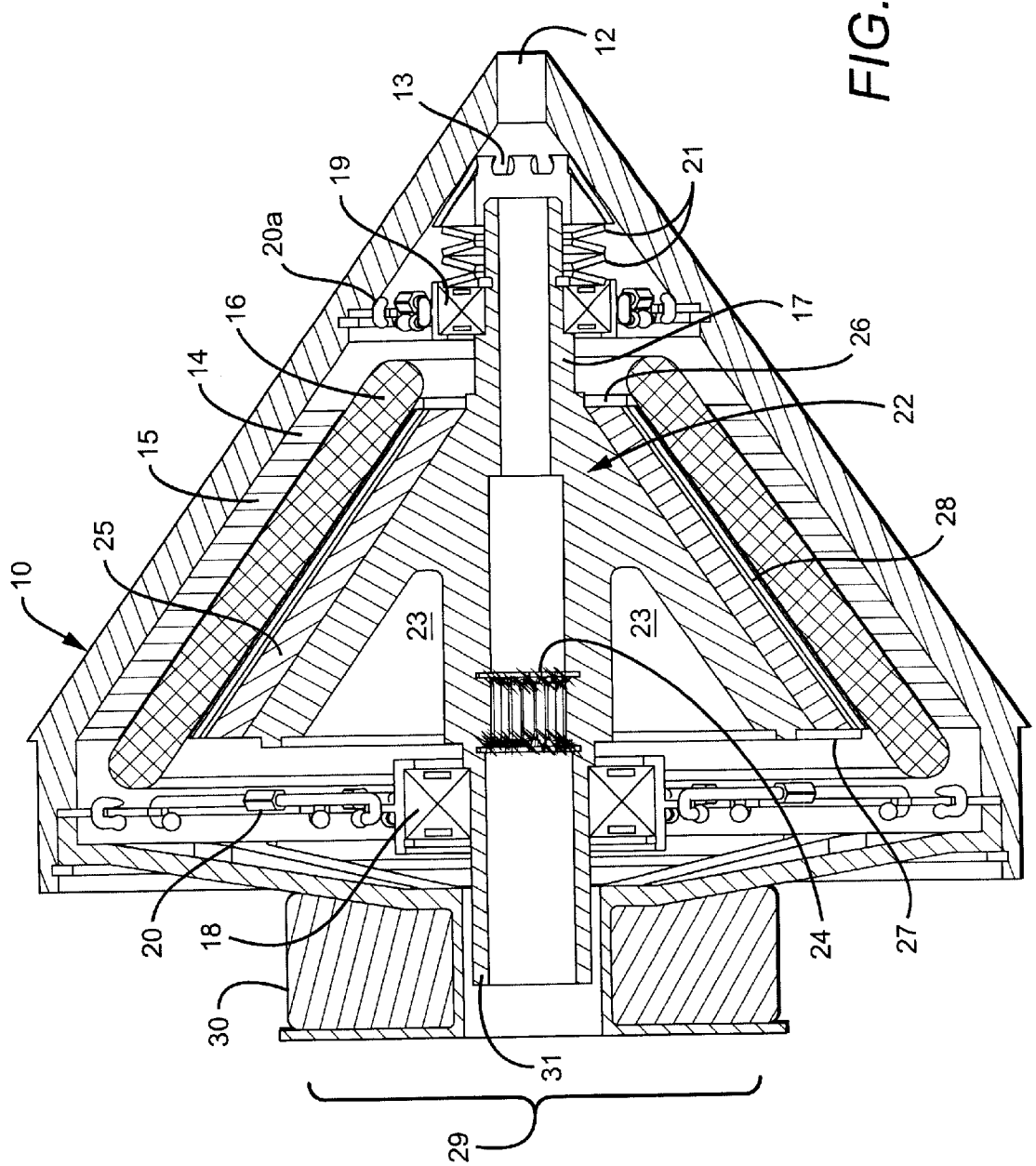
Figure 2:
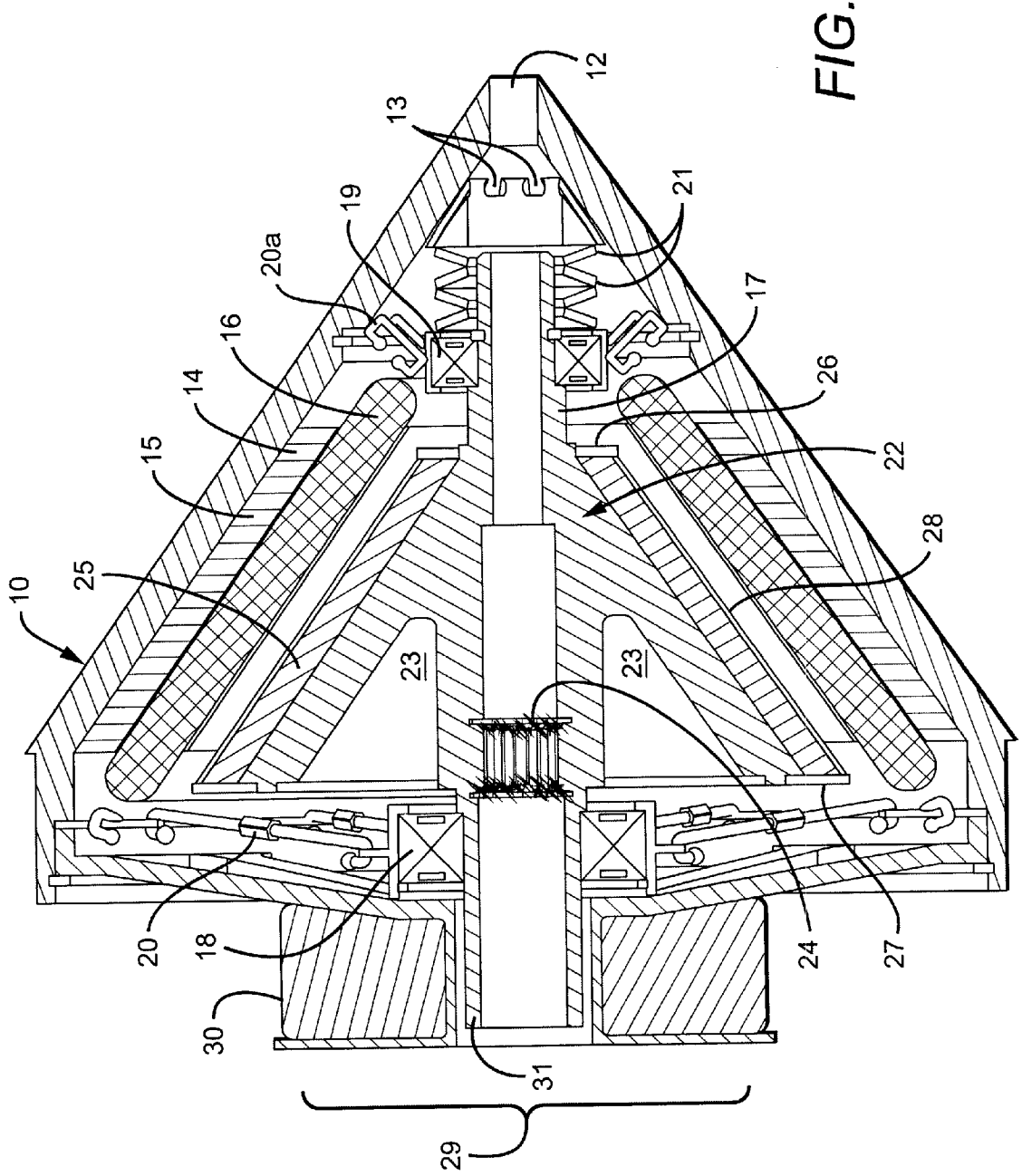
FIG. 2 is a longitudinal cross section illustrating axial displacement of the rotor from the stator.

A spring 21, shown in FIG. 1 as a stack of Belleville washers, and in FIG. 2 as a coiled spring, but which could take any of several other forms, provide a pre-load for the bearings and a balancing force against the magnetic attraction that exists between rotor and stator.

The rotor comprises a shaft/hub combination 22 that is hollowed out to reduce weight, in areas of low flux 23. Also featured in this hub is a female spline 24 used to couple it to its prime mover, the engine (not shown). It is to be understood that this coupling arrangement may take any of several forms to suit the application. Some of these forms could be a male spline, a drive pin, a polygon drive, etc.

Hub 22 supports a plurality of magnets 25 that are flanked by end rings 26 and 27 and are surrounded by a conical sleeve 28 made from a non-magnetic material such as stainless steel or Inconel. The selection of the non-magnetic material used for conical sleeve 28 will depend upon the stresses anticipated for the particular application or use. Conical sleeve 28 induces a compressive pre-load on magnets 25 and is welded, or otherwise attached to end rings 26 and 27 to prevent it from slipping axially toward the smaller end of the cone.

The embodiment described herein utilizes radially magnetized magnets, each forming an alternating pole, with interpolar spaces filled with a suitable non-magnetic filler, such as a ceramic, polymer, or other moldable or machinable plastic. In this embodiment, because it forms part of the flux path, hub 22 is made of magnetic steel, whereas end rings 26 and 27 are made from a non-magnetic material to avoid shorting magnets 25 magnetically.

It is to be understood, however, that this invention applies equally well to a segmented magnet configuration, where tangentially magnetized magnets are placed adjacently to pole pieces that form alternating magnetic poles, or other configurations such as a cast, multi-polar magnet, etc. In such a case, the hub ceases to be part of the flux path and is therefore made from a non-magnetic material, like the material used for construction of the end rings.

Completing the alternator, is a solenoid field assembly 29 comprising a coil 30. Solenoid field assembly 29 is preferably connected across the output, but beyond the rectifiers that convert the machine's AC output to DC. Because it uses the output voltage as its reference, coil 30 increases its magnetic intensity whenever the voltage is high, and decreases it whenever the voltage is low. Because the rotating shaft acts as the solenoid armature 31, rotor 17 is displaced axially out from within stator 14, or restored to its position of maximum output, depending on the voltage level. Thus, regulation is achieved, by rotor displacement, which in turn increases the actual or physical air gap between rotor and stator. The above described arrangement can be varied by providing a stationary extension to the shaft, to act as a plunger, or solenoid field, and connected to the shaft by a device such as a thrust or other bearing.

Also, to achieve extremely precise regulation, a control unit may be used between generator output and coil input.

As mentioned previously, the tapered alternator can be used as a brake. It can be actuated by simply reversing the current through coil 30, and allowing rotor 17 to jam within conical stator 14. For such a use, it is recommended that the inner surface of conical stator 14 be lined with a suitable brake lining material.

We claim:

1. A permanent magnet generator, having a stator and a rotor, where the rotor is attached to a rotatable shaft and where the shaft is capable of axial displacement for adjusting the output of the permanent magnet generator, the improvement comprising:

the stator having a tapered inner surface, having a brake lining material disposed thereon;

the rotor having a tapered outer surface having a plurality of permanent magnets positioned thereon, the outside surface of said rotor facing the inner surface of said stator; wherein, as the shaft is axially displaced, the distance between the stator inner surface and rotor outer surface changes;

a spring positioned adjacent to one end of said rotor;

a solenoid positioned adjacent to the opposite end of said rotor; and, where said positioning of said spring and said solenoid is necessary to counteract vibration modes in the axial direction.

2. The permanent magnet generator of claim 1 wherein a brake lining material is disposed on the outer ace of said rotor.

3. The permanent magnet generator of claim 1 wherein said stator further comprises a tapered outer surface.

4. A permanent magnet generator, having a stator and a rotor, where the rotor is attached to a rotatable shaft and where the shaft is capable of axial displacement, the improvement comprising:

the rotor having a tapered inner surface having a plurality of permanent magnets positioned thereon and having a spring and a solenoid adjacently positioned on opposing sides of said rotor to counteract vibration modes in the axial direction;

the stator having a tapered outer surface having brake lining material disposed thereon, the outside surface of said stator facing the inner surface of said rotor; wherein, as the shaft is axially displaced, the distance between the rotor inner surface and stator outer surface changes.

5. A permanent magnet generator, having a stator and a rotor, where the rotor is attached to a rotatable shaft and where the shaft is capable of axial displacement, the improvement comprising:

the rotor having a tapered inner surface having a plurality of permanent magnets positioned thereon, and having a brake lining material disposed thereon, said rotor further having a spring and a solenoid adjacently positioned on opposing sides of said rotor to counteract vibration modes in the axial direction;

the stator having a tapered outer surface, the outside surface of said stator facing the inner surface of said rotor; wherein, as the shaft is axially displaced, the distance between the rotor inner surface and stator outer surface changes.

6. A variable permanent magnet generator which can be used as a brake to prevent windmilling comprising:

a housing;

a stator within said housing having a substantially conical shaped inner surface;

a rotatable shaft;

a shaft support means which will allow axial displacement of said rotatable shaft;

a rotor disposed about a portion of said rotatable shaft, said rotor having a substantially conical shaped outer surface having a plurality of permanent magnets positioned thereon, the outer surface of said rotor facing the inner surface of said stator;

a mechanical spring means positioned around said rotatable shaft adjacent to the end of said rotor having the larger diameter and attached on one end to said housing and on the other end to said shaft support means;

a solenoid coil positioned around said shaft on the side of said rotor opposite said mechanical spring means; and, when in a first instance, no amperage is applied to said solenoid coil, the compressive force of said mechanical spring means is sufficient to axially position said rotor into frictional contact with said stator to prevent windmilling, and, in the second instance, when sufficient amperage is applied to the solenoid coil to overcome the compressive force of said mechanical spring means and the magnetic attraction of said rotor to said stator, voltage output is produced where the level of said voltage output is a function of the physical air gap between rotor and stator.

7. The variable permanent magnet generator of claim 6 wherein said stator further comprises a tapered outer surface.

8. A variable permanent magnet generator which can be used as a brake to prevent windmilling comprising:

a housing;

a stator within said housing having a substantially conical shaped inner surface;

a rotatable shaft;

a shaft support means which will allow axial displacement of said rotatable shaft;

a rotor disposed about a portion of said rotatable shaft, said rotor having a substantially conical shaped outer surface having a plurality of permanent magnets positioned thereon, the outer surface of said rotor facing the inner surface of said stator;

a mechanical spring means positioned around said rotatable shaft adjacent to the end of said rotor having the larger diameter and attached on one end to said housing and on the other end to said shaft support means;

a solenoid coil positioned around said shaft on the side of said rotor opposite said mechanical spring means; and, when in a first instance, a sufficient level of reverse current is applied to said solenoid coil to axially displace said rotor into frictional engagement with said stator to prevent windmilling and thereby cause said mechanical spring means to be in tension, and, in the second instance, when said sufficient level of reverse current applied to the solenoid coil is terminated, the tension of said mechanical spring means is sufficient to axially displace said rotor away from frictional engagement with the stator whereby voltage output is produced where the level of said voltage output is a function of the physical air gap between rotor and stator which can be controlled by the level of current applied to said solenoid coil.

9. The variable permanent magnet generator of claim 8 wherein said stator further comprises a tapered outer surface.

* * * * *